US012682084B2

(12) United States Patent
Carr et al.

(10) Patent No.: US 12,682,084 B2
(45) Date of Patent: Jul. 14, 2026

(54) THIRD-PARTY ANALYTIC AND MACHINE LEARNING MODEL VALIDATION

(71) Applicant: Enveil, Inc., Fulton, MD (US)

(72) Inventors: Ryan Carr, Fulton, MD (US); Yizhou Li, McLean, VA (US)

(73) Assignee: Enveil, Inc., Fulton, MD (US)

( * ) Notice: Subject to any disclaimer, the term of this patent is extended or adjusted under 35 U.S.C. 154(b) by 144 days.

(21) Appl. No.: 18/765,114

(22) Filed: Jul. 5, 2024

(65) Prior Publication Data

US 2025/0036780 A1     Jan. 30, 2025

Related U.S. Application Data

(60) Provisional application No. 63/529,576, filed on Jul. 28, 2023.

(51) Int. Cl.
*G06F 21/60* (2013.01)
*H04L 9/32* (2006.01)
(52) U.S. Cl.
CPC .......... *G06F 21/602* (2013.01); *G06F 21/606* (2013.01); *H04L 9/321* (2013.01)

(58) Field of Classification Search
CPC ....... G06F 21/602; G06F 21/606; H04L 9/321
See application file for complete search history.

(56) References Cited

U.S. PATENT DOCUMENTS

| | | | | |
|---|---|---|---|---|
| 2020/0034550 A1* | 1/2020 | Kim | ........................ | H04L 9/085 |
| 2020/0134204 A1* | 4/2020 | Furukawa | ............... | G06F 21/64 |
| 2020/0351078 A1* | 11/2020 | Kolte | .................... | G06F 21/602 |
| 2025/0211429 A1* | 6/2025 | Wang | ..................... | H04L 9/085 |

* cited by examiner

*Primary Examiner* — Ayoub Alata

(74) *Attorney, Agent, or Firm* — Carr & Ferrell LLP

(57) ABSTRACT

Systems and methods for validating analytics or machine learning models using secure multi-party computation (SMPC) are disclosed. The system operates with a data owner party providing a validation data set and an analytic owner party supplying a specification of the analytic or machine learning model. The analytic owner party converts the specification into an oblivious computation and compiles it into a circuit of operations compatible with an SMPC protocol. The data owner party downloads the compiled specification and constructs a validation circuit to execute the model against the validation data set without revealing the data or model details. The results of the SMPC are evaluated to produce performance statistics of the model, ensuring privacy for both parties' data throughout the process.

20 Claims, 6 Drawing Sheets

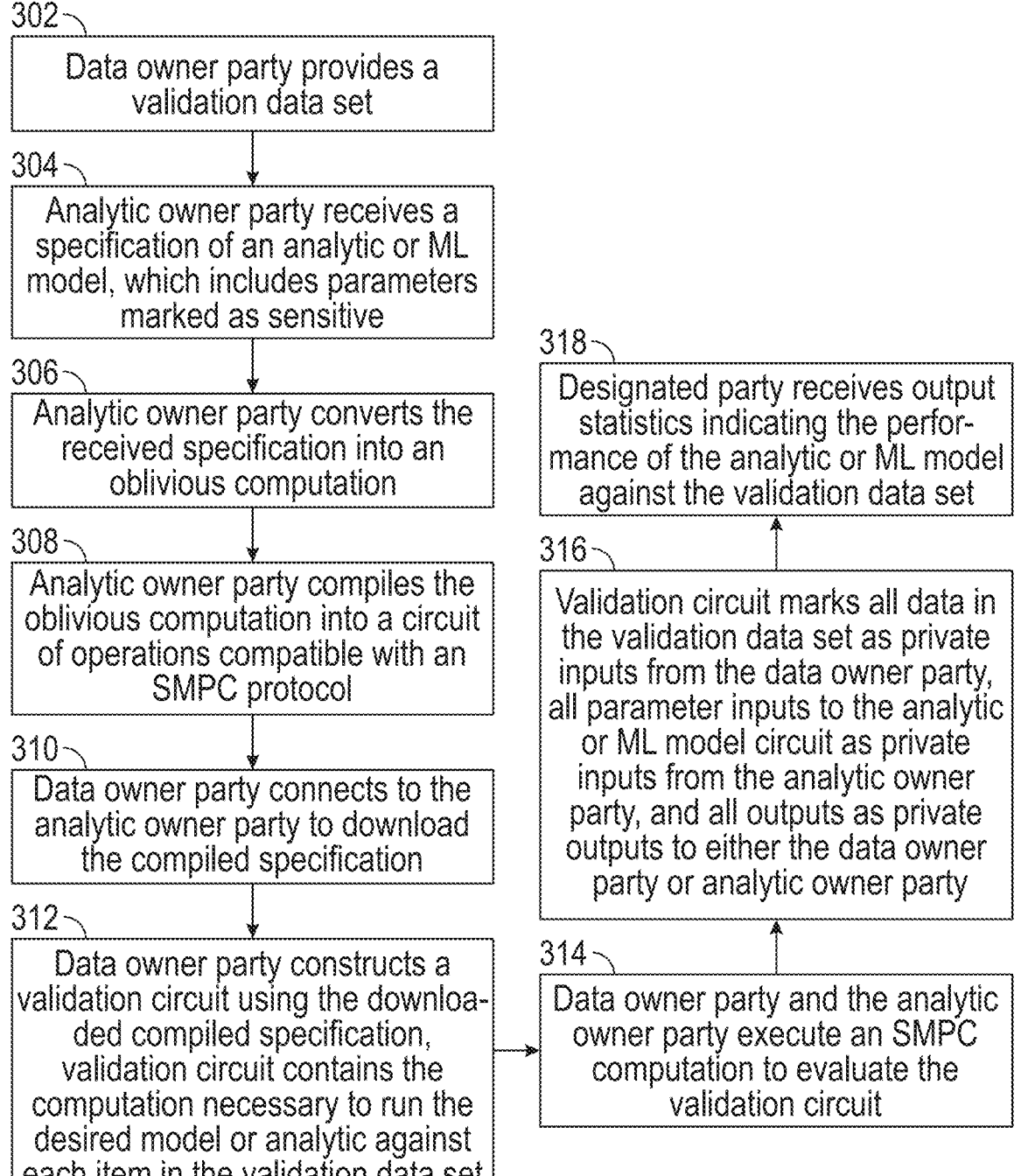

302

Data owner party provides a validation data set

304

Analytic owner party receives a specification of an analytic or ML model, which includes parameters marked as sensitive

306

Analytic owner party converts the received specification into an oblivious computation

308

Analytic owner party compiles the oblivious computation into a circuit of operations compatible with an SMPC protocol

310

Data owner party connects to the analytic owner party to download the compiled specification

312

Data owner party constructs a validation circuit using the downloaded compiled specification, validation circuit contains the computation necessary to run the desired model or analytic against each item in the validation data set

318

Designated party receives output statistics indicating the performance of the analytic or ML model against the validation data set

316

Validation circuit marks all data in the validation data set as private inputs from the data owner party, all parameter inputs to the analytic or ML model circuit as private inputs from the analytic owner party, and all outputs as private outputs to either the data owner party or analytic owner party

314

Data owner party and the analytic owner party execute an SMPC computation to evaluate the validation circuit

FIG. 3

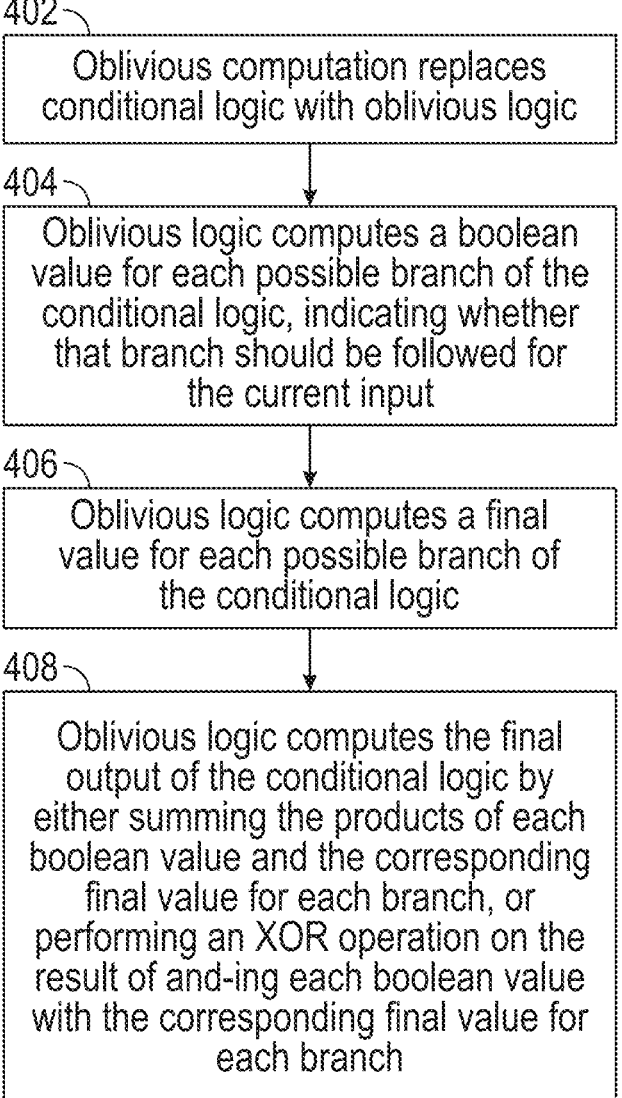

402 — Oblivious computation replaces conditional logic with oblivious logic

404 — Oblivious logic computes a boolean value for each possible branch of the conditional logic, indicating whether that branch should be followed for the current input 406 — Oblivious logic computes a final value for each possible branch of the conditional logic 408 — Oblivious logic computes the final output of the conditional logic by either summing the products of each boolean value and the corresponding final value for each branch, or performing an XOR operation on the result of and-ing each boolean value with the corresponding final value for each branch

FIG. 4

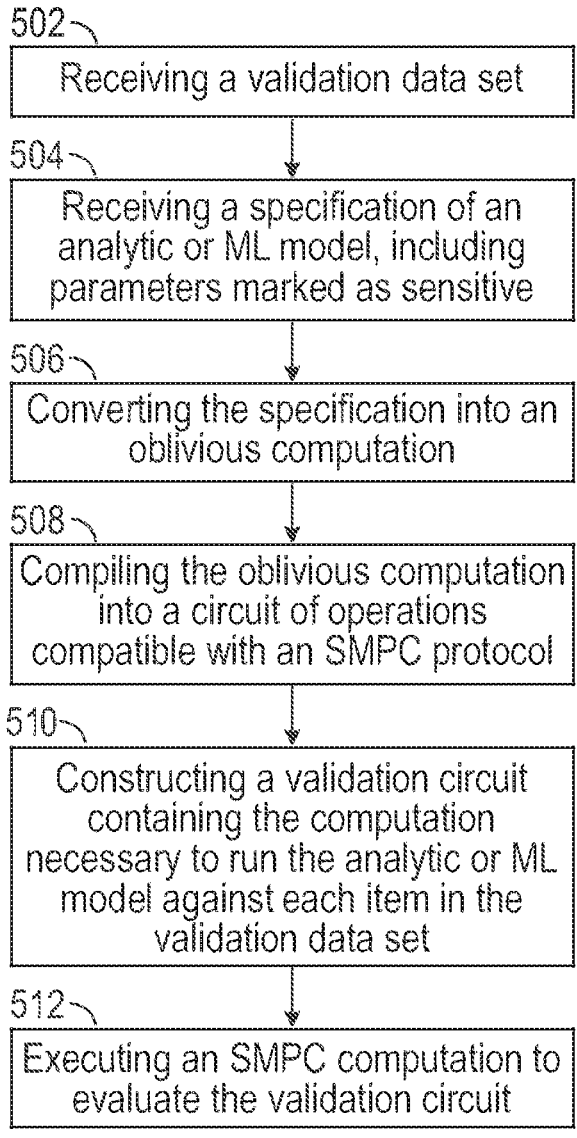

502 — Receiving a validation data set

504 — Receiving a specification of an analytic or ML model, including parameters marked as sensitive 506 — Converting the specification into an oblivious computation 508 — Compiling the oblivious computation into a circuit of operations compatible with an SMPC protocol 510 — Constructing a validation circuit containing the computation necessary to run the analytic or ML model against each item in the validation data set 512 — Executing an SMPC computation to evaluate the validation circuit

FIG. 5

THIRD-PARTY ANALYTIC AND MACHINE LEARNING MODEL VALIDATION

CROSS REFERENCE TO RELATED APPLICATIONS

This application claims the benefit and priority of U.S. Provisional Application Ser. No. 63/529,576, filed on Jul. 28, 2023, which is hereby incorporated by reference herein in its entirety, including all references and appendices cited therein, for all purposes.

FIELD

The present disclosure relates to methods and systems for validating analytics and machine learning models, specifically through the use of secure multi-party computation (SMPC) protocols.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for validating analytics or machine learning (ML) models using secure multi-party computation (SMPC). The method also includes a data owner party providing a validation data set; an analytic owner party receiving a specification of an analytic or ML model, the specification including parameters marked as sensitive, the analytic owner party converting the specification into an oblivious computation, the analytic owner party compiling the oblivious computation into a circuit of operations compatible with an SMPC protocol; the data owner party connecting to the analytic owner party to download the compiled specification, the data owner party constructing a validation circuit, the validation circuit containing the computation necessary to run the desired model or analytic against each item in the validation data set; and the data owner party and the analytic owner party executing an SMPC to evaluate the validation circuit, at the end of which a designated party receives output statistics indicating the performance of the analytic or ML model against the validation data set. Other embodiments of this aspect include corresponding computer systems, apparatus, and computer programs recorded on one or more computer storage devices, each configured to perform the actions of the methods.

Implementations may include one or more of the following features. The method where the specification includes a detailed representation of the structure and operations of the analytic or ML model, such as a neural network architecture with specific layer configurations, activation functions, and weight matrices. The specification includes hyperparameters and optimization parameters, such as learning rates, regularization coefficients, and batch sizes, that govern the training and performance of the ML model. The SMPC protocol is a secure computation protocol that enables the execution of computations over encrypted data without revealing the inputs to any party involved. The oblivious computation replaces conditional logic with oblivious logic. The oblivious logic computes a Boolean value for each possible branch of the conditional logic, indicating whether that branch should be followed for the current input; a final value for each possible branch of the conditional logic; and the final output of the conditional logic, where the final output is computed by either summing the products of each Boolean value and the corresponding final value for each branch, or performing an XOR operation on the result of AND-ing each Boolean value with the corresponding final value for each branch. The validation circuit marks all data in the validation data set as private inputs from the data owner party, all parameter inputs to the analytic or ML model circuit as private inputs from the analytic owner party, and all outputs as private outputs to either the data owner party or the analytic owner party. Implementations of the described techniques may include hardware, a method or process, or computer software on a computer-accessible medium.

One general aspect includes a system for performing validation of analytics or machine learning (ML) models using secure multi-party computation (SMPC). The system also includes a data owner component, configured by a data owner party, that provides a validation data set; an analytic owner component, configured by an analytic owner party, that receives a specification of an analytic or ML model, the specification including parameters marked as sensitive, and converts the specification into an oblivious computation which is compiled into a circuit of operations compatible with an SMPC protocol; a connection module allowing the data owner component to connect to the analytic owner component and download the compiled specification, then construct a validation circuit; and an execution module which allows both the data owner component and the analytic owner component to execute an SMPC to evaluate the validation circuit, with the final output statistics indicating the performance of the analytic or ML model against the validation data set being received by a designated party. Other embodiments of this aspect include corresponding computer systems, apparatus, and computer programs recorded on one or more computer storage devices, each configured to perform the actions of the methods.

Implementations may include one or more of the following features. The system where the specification includes a detailed representation of the structure and operations of the analytic or ML model, such as a neural network architecture with specific layer configurations, activation functions, and weight matrices. The specification includes hyperparameters and optimization parameters, such as learning rates, regularization coefficients, and batch sizes, that govern the training and performance of the ML model. The SMPC protocol is a secure computation protocol that enables the execution of computations over encrypted data without revealing the inputs to any party involved. The oblivious computation replaces any conditional logic with oblivious logic. The oblivious logic computes a Boolean value for each possible branch of the conditional logic, indicating whether that branch should be followed for the current input; a final value for each possible branch of the conditional logic; and the final output of the conditional logic, where the final output is computed by either summing the products of each Boolean value and the corresponding final value for each branch, or performing an x or operation on the result of AND-ing each Boolean value with the corresponding final value for each branch. The validation circuit marks all data in the validation data set as private inputs from the data owner party, all parameter inputs to the analytic or ML model circuit as private inputs from the analytic owner party, and all outputs as private outputs to either the data owner party or the analytic owner party. The system may include the data owner party providing a training data set, the data owner party and the analytic owner party executing an SMPC to evaluate a training circuit, the training circuit constructed similarly as the validation circuit, to adapt the parameters of the ML model based on the training data set without revealing sensitive information of either party. The validation circuit further may include the full computation necessary to run the desired model or analytic against each item in the validation data, compare the result to the desired result for that item, and compute the desired overall statistics for these results. The validation circuit marks all data in the validation data set as private inputs from the data owner party. The validation circuit marks all parameter inputs to the analytic or ML model circuit as private inputs from the analytic owner party. Implementations of the described techniques may include hardware, a method or process, or computer software on a computer-accessible medium.

One general aspect includes a method for validating analytics or machine learning (ML) models using secure multi-party computation (SMPC). The method also includes receiving a validation data set; receiving a specification of an analytic or ML model, including parameters marked as sensitive; converting the specification into an oblivious computation; compiling the oblivious computation into a circuit of operations compatible with an SMPC protocol constructing a validation circuit containing the computation necessary to run the analytic or ml model against each item in the validation data set; and executing an SMPC to evaluate the validation circuit. Other embodiments of this aspect include corresponding computer systems, apparatus, and computer programs recorded on one or more computer storage devices, each configured to perform the actions of the methods.

BRIEF DESCRIPTION OF THE DRAWINGS

FIG. 3 is a flowchart that illustrates a method for validation of analytics or ML models using SMPC.

FIG. 4 is a flowchart that illustrates a method related to oblivious computation logic.

FIG. 5 illustrates a method for validating analytics or machine learning (ML) models using secure multi-party computation (SMPC), performed by a computer system

DETAILED DESCRIPTION OF EXAMPLE EMBODIMENTS

Overview

Figure 1:
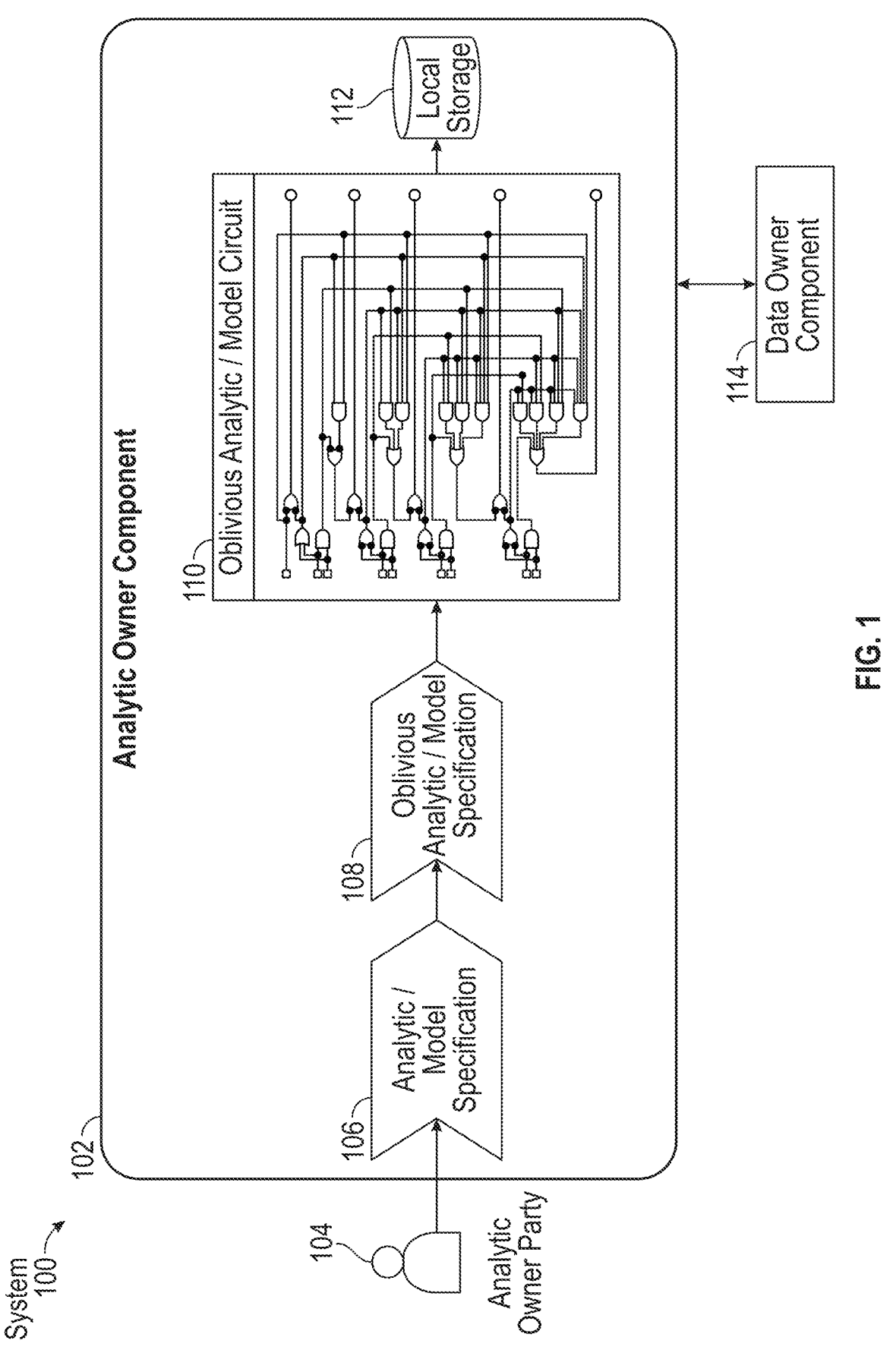
FIG. 1 illustrates the full process performed by the analytic owner party on the input specification and shows the analytic/model preparation process conducted by the analytic owner component before the data owner component starts a validation session.

Many organizations have data sets that are large or complex, and therefore could benefit from leveraging analytics or machine learning models against their data in order to make better decisions. Developing these analytics or machine learning models requires data science expertise, and many organizations that hold these data sets do not have the capacity to develop them on their own. Recognizing this need in the market, many businesses that employ data scientists have begun offering analytics and machine learning models for sale.

When seeking to purchase one of these analytics or machine learning models, the data owner organization would like to know that it will perform well on their specific data set. This creates a challenge: the straightforward ways of running this assessment would be to either give the data owner access to the model/analytic before the sale, or give the model/analytic vendor access to the data before the sale, and neither of these approaches is ideal for both parties. The model/analytic vendor may not want to give access to their product before a sale, because it contains valuable intellectual property that can be easily stolen, while the data owner organization may not want to provide the model/analytic vendor with access to their data out of concern that the vendor could be dishonest in running the assessment (or the data owner organization may be subject to laws or rules that prohibit sending their data to third parties).

Secure Multi-Party Computation (SMPC) protocols are a family of cryptographic protocols that allow two or more participating parties to jointly compute some function depending upon inputs from each party and provide the output of the function to one or more participants. The SMPC protocol protects the inputs of some or all participating parties, such that no other participating party is able to learn anything about the protected inputs. Only the final output of the computed function is accessible, and only to the specific parties agreed to at the start of the protocol. Different SMPC schemes exist that support different types of functions: the Yao Garbled Circuits scheme support any function that can be expressed as a binary circuit of AND, OR, and NOT gates connected by wires carrying true or false values, while the Arithmetic Secret Sharing scheme and Boolean Secret Sharing scheme support functions that can be expressed as a circuit of arithmetic (i.e., addition and multiplication) or Boolean (i.e., AND, OR, and NOT) operations over values in some input domain. So-called "ABY" schemes also exist, which support computations that are a combination of functions supported by the Arithmetic Secret Sharing, Boolean Secret Sharing, and Yao Garbled Circuits schemes and contain sub-protocols for switching between these schemes.

EXAMPLE EMBODIMENTS

Systems and methods disclosed herein conduct a validation of analytics or machine learning (ML) models using secure multi-party computation (SMPC). An example system 100 illustrated in FIG. 1, runs in a two-party configuration, where one party, the data owner party, is the organization that owns the test data and the other party, the analytic owner party, is the organization that owns the analytic or ML model. By using SMPC, the system computes performance statistics of the analytic or ML model over the test data set without ever revealing the test data set to the model owner or the details of the analytic or ML model to the data owner.

The system 100 includes two software components, one installed and administered by each party. An analytic owner component 102 is installed and configured first by the analytic owner party 104. As part of this process, the analytic owner party 104 provides a specification 106 of how their analytic or ML model performs computations to the analytic owner component 102. This specification 106 can be in the form of executable code in a standard programming language (e.g., Python or C++) for analytics that perform arbitrary computations or, for ML models and other analytics that share a common format, the specification 106 can be a list of parameters (e.g., neural network structure and weight vectors). This specification 106 includes a mechanism to mark which parameters of the analytic or ML model must be considered sensitive, and not revealed to the data owner party as part of the SMPC protocol.

The analytic owner component 102 first converts the specification into an oblivious specification 108 (i.e., one in which the instructions performed do not depend on any input, also referred to as a computation). Algorithms without any conditional logic, such as if/then/else statements or variable-length loops, are already oblivious. For specifications that are not already oblivious, the analytic owner component 102 replaces any conditional logic with oblivious logic that computes: for each possible branch of the conditional logic, a Boolean value indicating whether that branch should be followed for the current input; for each possible branch of the conditional logic, the final value computed by that branch; and the final output of the conditional logic, as a sum (or XOR) of each value from the Boolean computation times (or AND-ed with) the corresponding value from the branch computation.

The analytic owner component 102 then uses the oblivious version of the specification to compile the computations performed by the analytic or ML model into an oblivious analytic/model circuit 110 of operations compatible with an SMPC protocol (Yao Garbled Circuits, Arithmetic Secret Sharing, Boolean Secret Sharing, or ABY), using standard tools and techniques for compiling machine language into a computation circuit such as the oblivious analytic/model circuit 110. Note that Yao Garbled Circuits support all oblivious computations, so this conversion is always possible.

The analytic owner component 102 then saves a compiled specification in local storage 112 for use when the data owner component 114 initiates an evaluation session. FIG. 1 illustrates the full process performed by the analytic owner party 104 on the input specification and shows the analytic/model preparation process conducted by the analytic owner component 102 before the data owner component 114 starts a validation session.

The data owner component 114 is launched and configured next by the data owner party. As part of the configuration process, the data owner party provides the connection information (i.e., a URL and authentication credentials) for connecting with the analytic owner component 102, as well as indicating the location of their validation data, which analytic or model on the analytic owner component 102 they want to evaluate, and the desired output of the evaluation (e.g., a confusion matrix, ML model loss statistics, etc.).

The data owner component 114 then connects to the analytic owner component 102, downloads the compiled specification for the desired model or analytic, and constructs the validation circuit. The validation circuit contains the full computation necessary to run the desired model or analytic against each item in the validation data, compare the result to the desired result for that item, and compute the desired overall statistics for these results. This validation circuit will mark all data in the validation data set as private inputs from the data owner party, all parameter inputs to the analytic or ML model circuit as private inputs from the analytic owner party 104, and all outputs as private outputs to the data owner party (it is also possible to configure the system so the analytic owner party 104 receives them instead, for some use cases this is more desirable).

Figure 2:
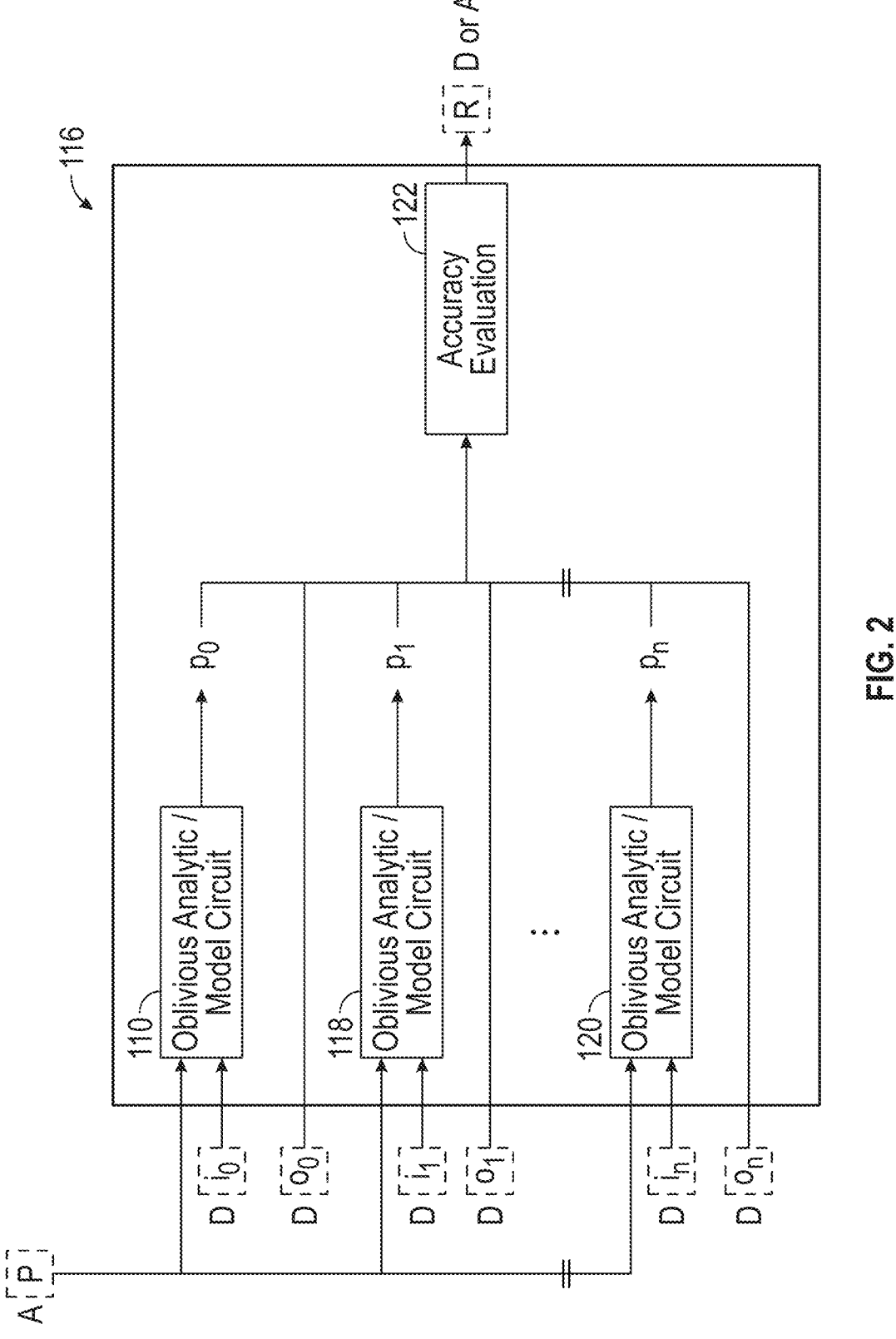
FIG. 2 illustrates a full circuit and a detailed process of validating analytics or machine learning models using secure multi-party computation (SMPC).

FIG. 2 illustrates an example full circuit 116 having a plurality of individual oblivious analytic/model circuits such as 110, 118, and 120. Referring now to FIGS. 1 and 2 collectively, the full circuit 116 accepts input vectors i and o (provided by the data owner party) containing the validation inputs and expected outputs to the analytic or model, and input matrix P from the analytic owner party 104. The oblivious analytic/model circuit 110 computes the final desired results matrix R and returns it to either the data owner party or the analytic owner party, depending on how the oblivious analytic/model circuit 110 was configured.

The data owner component 114 then sends a final and validated version of the oblivious analytic/model circuit 110 to the analytic owner component 102, and both components execute an SMPC to evaluate this final and validated version. At the end of this process, the desired party receives the final output statistics indicating how well the analytic or ML model performed against the validation data set.

In more detail, the process begins with the analytic owner party 104 providing the model parameters P, which need to remain confidential. Simultaneously, the data owner party provides input vectors i0, i1, . . . , in and expected output vectors o0, o1, . . . , on for validation, which are also kept confidential. Each pair of input vectors i and expected output vectors o is processed through an oblivious analytic/model circuit (110, 118, or 120), designed to perform computations without revealing any sensitive data. These circuits 110, 118, and 120 compute partial results P0, P1, . . . , Pn for their corresponding input vectors i, ensuring that no information about the data owner party's inputs or the analytic owner party's model parameters P is leaked. The partial results P0, P1, . . . , Pn are then aggregated and fed into the accuracy evaluation component 122, which computes the final performance statistics R of the machine learning model by comparing the model's predictions with the expected outputs o. This process ensures the secure and private validation of the machine learning model, maintaining the confidentiality of both parties' sensitive information.

FIG. 3 is a flowchart that illustrates a method for validation of analytics or ML models using SMPC. In step 302, the data owner party provides a validation data set. This validation data set includes a collection of data points that the data owner wishes to use for evaluating the performance of the analytic or ML model. The data set is prepared and formatted according to the requirements specified for the validation process, ensuring it is ready for the subsequent steps in the method.

In step 304, the analytic owner party receives a specification of an analytic or ML model, which includes parameters marked as sensitive. This specification may be detailed, covering the structure and operations of the model, such as a neural network architecture with specific layer configurations, activation functions, and weight matrices. The specification also includes hyperparameters and optimization parameters, such as learning rates, regularization coefficients, and batch sizes, which govern the training and performance of the ML model.

In step 306, the analytic owner party converts the received specification into an oblivious computation. Oblivious computation ensures that the instructions performed do not depend on any input values, thereby protecting the sensitive parameters of the model. This involves transforming conditional logic within the specification into oblivious logic, where all possible execution paths are considered.

In step 308, the analytic owner party compiles the oblivious computation into a circuit of operations compatible with an SMPC protocol. This step involves translating the oblivious computation into a format that can be processed securely by the SMPC protocol, ensuring that the sensitive data remains protected throughout the computation.

In step 310, the data owner party connects to the analytic owner party to download the compiled specification. This connection is established using secure communication protocols, ensuring that the transfer of the compiled specification is protected against unauthorized access. In step 312, the data owner party constructs a validation circuit using the downloaded compiled specification. The validation circuit is designed to execute the analytic or ML model on the validation data set, enabling the performance evaluation without revealing sensitive information. It will be understood that the validation circuit contains the computation necessary to run the desired model or analytic against each item in the validation data set. This can involve setting up the necessary inputs and ensuring that the circuit is configured to process the data correctly according to the compiled specification.

In step 314, the data owner party and the analytic owner party execute an SMPC to evaluate the validation circuit. This execution involves both parties performing the computation collaboratively, with the SMPC protocol ensuring that neither party can access the other's sensitive data during the process.

In step 316, the validation circuit marks all data in the validation data set as private inputs from the data owner party, all parameter inputs to the analytic or ML model circuit as private inputs from the analytic owner party, and all outputs as private outputs to either the data owner party or the analytic owner party. This ensures that the privacy of the data and model parameters is maintained throughout the computation.

In step 318, a designated party receives output statistics indicating the performance of the analytic or ML model against the validation data set. These statistics provide a comprehensive evaluation of how well the model performs on the given data, enabling the data owner to make informed decisions about the model's suitability for their needs.

As an optional step, the specification includes a detailed representation of the structure and operations of the analytic or ML model, such as a neural network architecture with specific layer configurations, activation functions, and weight matrices. This detailed representation helps ensure the model's performance is accurately evaluated.

As another optional step, the specification includes hyperparameters and optimization parameters, such as learning rates, regularization coefficients, and batch sizes, which govern the training and performance of the ML model. Including these parameters ensures the model is assessed under conditions that closely match its intended operational environment.

FIG. 4 is a flowchart that illustrates a method related to oblivious computation logic. In step 402, the oblivious computation replaces conditional logic with oblivious logic. In step 404, the oblivious logic computes a Boolean value for each possible branch of the conditional logic, indicating whether that branch should be followed for the current input. In step 406, the oblivious logic computes a final value for each possible branch of the conditional logic. In step 408, the oblivious logic computes the final output of the conditional logic by either summing the products of each Boolean value and the corresponding final value for each branch, or performing an XOR operation on the result of AND-ing each Boolean value with the corresponding final value for each branch.

FIG. 5 illustrates a method for validating analytics or machine learning (ML) models using secure multi-party computation (SMPC), performed by a computer system. In step 502, the method includes receiving a validation data set. This validation data set includes a collection of data points that the data owner wishes to use for evaluating the performance of the analytic or ML model. The data set is prepared and formatted according to the requirements specified for the validation process, ensuring the data set is ready for the subsequent steps in the method.

In step 504, the method includes receiving a specification of an analytic or ML model, including parameters marked as sensitive. This specification may be detailed, covering the structure and operations of the model, such as a neural network architecture with specific layer configurations, activation functions, and weight matrices. The specification also includes hyperparameters and optimization parameters, such as learning rates, regularization coefficients, and batch sizes, which govern the training and performance of the ML model.

In step 506, the method includes converting the specification into an oblivious computation. Oblivious computation ensures that the instructions performed do not depend on any input values, thereby protecting the sensitive parameters of the model. This can involve transforming conditional logic within the specification into oblivious logic, where all possible execution paths are considered.

In step 508, the method includes compiling the oblivious computation into a circuit of operations compatible with an SMPC protocol. This step involves translating the oblivious computation into a format that can be processed securely by the SMPC protocol, ensuring that the sensitive data remains protected throughout the computation.

In step 510, the method includes constructing a validation circuit containing the computation necessary to run the analytic or ML model against each item in the validation data set. This involves setting up the necessary inputs and ensuring that the circuit is configured to process the data correctly according to the compiled specification. The validation circuit marks all data in the validation data set as private inputs from the data owner party, all parameter inputs to the analytic or ML model circuit as private inputs from the analytic owner party, and all outputs as private outputs to either the data owner party or the analytic owner party. This ensures that the privacy of the data and model parameters is maintained throughout the computation.

In step 512, the method includes executing an SMPC to evaluate the validation circuit. This execution involves both parties performing the computation collaboratively, with the SMPC protocol ensuring that neither party can access the other's sensitive data during the process. At the end of this process, the desired party receives the final output statistics indicating how well the analytic or ML model performed against the validation data set.

Figure 6:
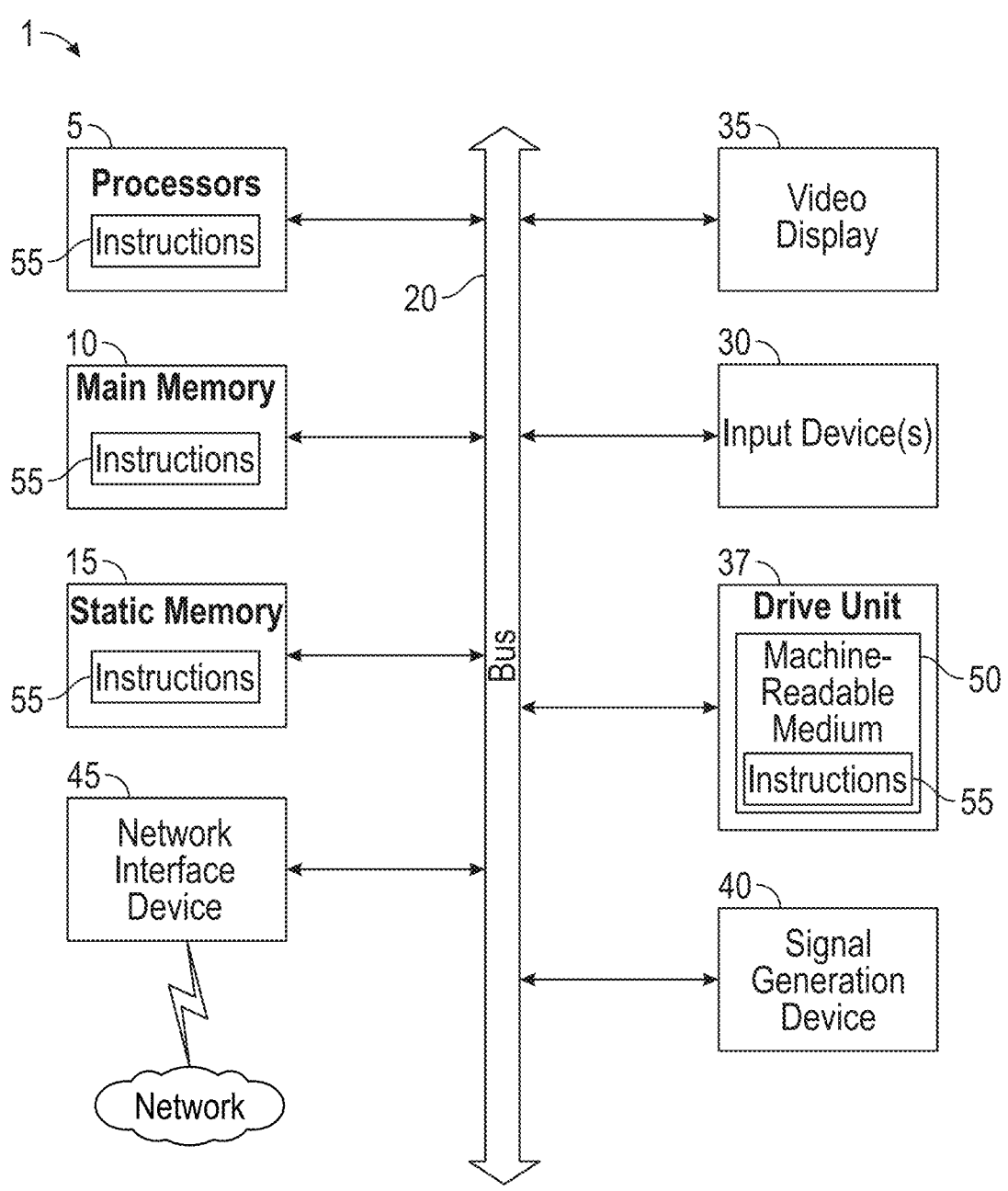
FIG. 6 is a diagrammatic representation of an example machine in the form of a computer system.

FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Where appropriate, the functions described herein can be performed in one or more of hardware, software, firmware, digital components, or analog components. For example, the encoding and or decoding systems can be embodied as one or more application specific integrated circuits (ASICs) or microcontrollers that can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present disclosure. However, it will be apparent to one skilled in the art that the present disclosure may be practiced in other embodiments that depart from these specific details.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

What is claimed is:

1. A method for validating analytics or machine learning (ML) models using secure multi-party computation (SMPC), the method comprising:
   a data owner party providing a validation data set;
   an analytic owner party receiving a specification of an analytic or ML model, the specification including parameters marked as sensitive, the analytic owner party converting the specification into an oblivious computation, the analytic owner party compiling the oblivious computation into a circuit of operations compatible with an SMPC protocol;
   the data owner party connecting to the analytic owner party to download the compiled specification, the data owner party constructing a validation circuit, the validation circuit containing a computation necessary to run the ML model or analytic against each item in the validation data set; and
   the data owner party and the analytic owner party executing an SMPC to evaluate the validation circuit, at the end of which a designated party receives output statistics indicating a performance of the analytic or ML model against the validation data set.

2. The method of claim 1, wherein the specification includes a detailed representation of a structure and operations of the analytic or ML model, comprising a neural network architecture with specific layer configurations, activation functions, and weight matrices.

3. The method of claim 1, wherein the specification includes hyperparameters and optimization parameters, comprising learning rates, regularization coefficients, and batch sizes, that govern training and performance of the ML model.

4. The method of claim 1, wherein the SMPC protocol is a secure computation protocol that enables execution of computations over encrypted data without revealing inputs to any party involved.

5. The method of claim 1, wherein the oblivious computation replaces conditional logic with oblivious logic.

6. The method of claim 5, wherein the oblivious logic computes a Boolean value for each possible branch of the conditional logic, indicating whether that branch should be followed for a current input; a final value for each possible branch of the conditional logic; and a final output of the conditional logic, wherein the final output is computed by either summing products of each Boolean value and the corresponding final value for each branch, or performing an XOR operation on a result of AND-ing each Boolean value with the corresponding final value for each branch.

7. The method of claim 1, wherein the validation circuit marks all data in the validation data set as private inputs from the data owner party, all parameter inputs to the analytic or ML model as private inputs from the analytic owner party, and all outputs as private outputs to the data owner party.

8. The method of claim 1, wherein the analytic owner party receives the output statistics.

9. A system for performing validation of analytics or machine learning (ML) models using secure multi-party computation (SMPC), the system comprising:
   a data owner component of a processor that is configured by a data owner party, that provides a validation data set;
   an analytic owner component of the processor that is configured by an analytic owner party, that receives a specification of an analytic or ML model, the specification including parameters marked as sensitive, and converts the specification into an oblivious computation which is compiled into a circuit of operations compatible with an SMPC protocol;

a connection module of the processor allowing the data owner component to connect to the analytic owner component and download the compiled specification, then construct a validation circuit; and an execution module of the processor which allows both the data owner component and the analytic owner component to execute an SMPC to evaluate the validation circuit, with final output statistics indicating a performance of the analytic or ML model against the validation data set being received by a designated party.

10. The system of claim 9, wherein the specification includes a detailed representation of a structure and operations of the analytic or ML model, comprising a neural network architecture with specific layer configurations, activation functions, and weight matrices.

11. The system of claim 9, wherein the specification includes hyperparameters and optimization parameters, comprising learning rates, regularization coefficients, and batch sizes, that govern training and performance of the ML model.

12. The system of claim 9, wherein the SMPC protocol is a secure computation protocol that enables execution of computations over encrypted data without revealing inputs to any party involved.

13. The system of claim 9, wherein the oblivious computation replaces any conditional logic with oblivious logic.

14. The system of claim 13, wherein the oblivious logic computes a Boolean value for each possible branch of the conditional logic, indicating whether that branch should be followed for a current input; a final value for each possible branch of the conditional logic; and a final output of the conditional logic, wherein the final output is computed by either summing products of each Boolean value and the corresponding final value for each branch, or performing an XOR operation on a result of AND-ing each Boolean value with the corresponding final value for each branch.

15. The system of claim 9, wherein the validation circuit marks all data in the validation data set as private inputs from the data owner party, all parameter inputs to the analytic or ML model as private inputs from the analytic owner party, and all outputs as private outputs to the data owner party, wherein the analytic owner party receives the final output statistics.

16. The system of claim 9, further comprising the data owner party providing a training data set, the data owner party and the analytic owner party executing the SMPC to evaluate a training circuit, the training circuit constructed similarly as the validation circuit, to adapt the parameters of the ML model based on the training data set without revealing sensitive information of either party.

17. The system of claim 9, wherein the validation circuit further comprises a full computation necessary to:

run the ML model or analytic against each of a plurality of items in the validation data, to obtain results;

compare the results to desired results, to obtain final results; and compute desired overall statistics for the final results.

18. The system of claim 9, wherein the validation circuit marks all data in the validation data set as private inputs from the data owner party, and the validation circuit marks all parameter inputs to the analytic or ML model as private inputs from the analytic owner party.

19. A method for validating analytics or machine learning (ML) models using secure multi-party computation (SMPC), performed by a computer system, the method comprising:

receiving a validation data set;

receiving a specification of an analytic or ML model, including parameters marked as sensitive;

converting the specification into an oblivious computation;

compiling the oblivious computation into a circuit of operations compatible with an SMPC protocol;

constructing a validation circuit containing a computation necessary to run the analytic or ML model against each item in the validation data set; and executing an SMPC to evaluate the validation circuit.

20. The method of claim 19, further comprising receiving output statistics indicating a performance of the analytic or ML model against the validation data set.

* * * * *